June 2, 1925.

A. H. HITCHCOCK 1,540,473

MEASURING INSTRUMENT ATTACHMENT

Filed March 9, 1923

Alfred H. Hitchcock, INVENTOR.

BY

Frank A. Cutter, ATTORNEY.

Patented June 2, 1925.

1,540,473

UNITED STATES PATENT OFFICE.

ALFRED H. HITCHCOCK, OF MITTINEAGUE, MASSACHUSETTS.

MEASURING-INSTRUMENT ATTACHMENT.

Application filed March 9, 1923. Serial No. 623,899.

*To all whom it may concern:*

Be it known that I, ALFRED H. HITCHCOCK, a citizen of the United States of America, and a resident of Mittineague, in the county of Hampden and State of Massachusetts, have invented a new and useful Measuring-Instrument Attachment, of which the following is a specification.

My invention relates to improvements in attachments or devices for micrometer gages, height gages, and other measuring instruments, and consists essentially of a holder with a ball loosely retained therein, which holder is adapted to be engaged with and disengaged from the anvil, post, arm, or other jaw member of an instrument with which this attachment or device is designed to be employed, as hereinafter more fully set forth.

The primary object of my invention is to provide a simple, inexpensive, convenient, and durable device that can be readily attached to and detached from a measuring instrument, and when attached to said instrument makes the same capable of measuring and gaging objects that could not be measured or gaged with exactness between flat parts or surfaces, such as the adjacent end surfaces of the post and anvil of a micrometer gage. In other words, this attachment facilitates the act or operation of measuring objects having concave surfaces.

My attachment is more especially designed for use in connection with micrometer gages, on either the anvils or posts thereof, or on both anvil and post of such a gage, if desired, two of the attachments then being required for the single measuring instrument. The attachment may, however, be constructed to fit the arm or arm extension of a height gage, or the jaw member of some other measuring instrument.

Owing to the fact that the ball of the attachment is loosely held in place, the wear of the ball incident to use is reduced to the minimum, the measuring or gaging operations are facilitated, and there is little or no opportunity for dust and dirt to collect or accumulate to an extent that would impair the accuracy of the measuring elements of the instrument augmented by said attachment.

Other objects and advantages will appear in the course of the following description.

I attain the objects and secure the advantages of my invention by the means illustrated in the accompanying drawings, in which—

Figure 1:
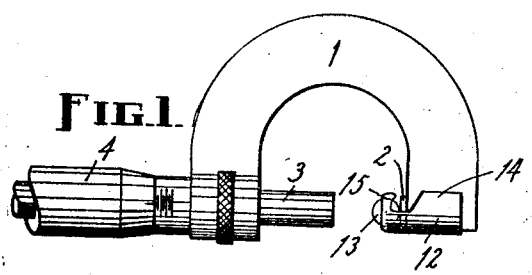
Figure 2:
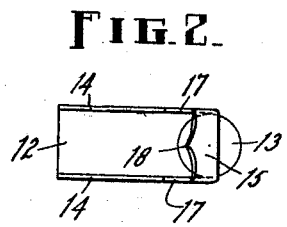
Figure 3:
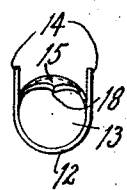
Figure 4:
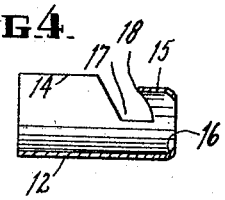
Figure 5:
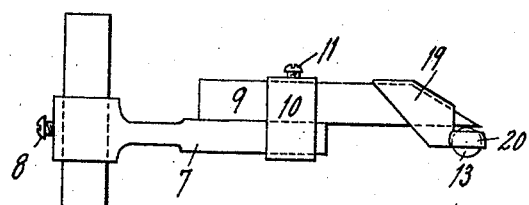
Figure 6:
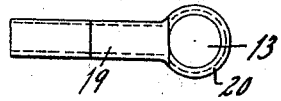
Figure 7:
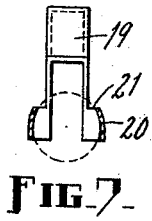
Figure 8:
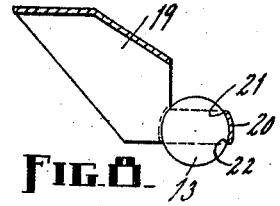

Figure 1 is a side elevation of the major portion of a micrometer gage equipped with a preferred form of my attachment; Fig. 2, an enlarged, top plan of said attachment; Fig. 3, an enlarged, right-hand end elevation of the attachment; Fig. 4, an enlarged, longitudinal section through the holder of the attachment before the ball is placed in said holder and the latter is bent to retain said ball in place; Fig. 5, a side elevation of a height gage equipped with an attachment especially adapted thereto; Fig. 6, an enlarged, top plan of the second attachment; Fig. 7, an enlarged, right-hand end elevation in partial section of the holder of said second attachment, showing the portion thereof which is provided to receive the ball, before such portion is upset at the right-hand end, and, Fig. 8, an enlarged, longitudinal, vertical section through the second attachment.

Similar reference characters designate similar parts throughout the several views.

In the first view an ordinary micrometer gage is illustrated, the same comprising a yoke 1 between an anvil 2 and a movable post 3 protruding from a barrel extension 4; while in Fig. 5 a height gage is represented, which comprises a base 5, a fixed post 6, an arm 7 sleeved to and adjustable on said fixed post, a lock screw 8 for said arm, an extension 9 adjustable on said arm, and a clamp 10 and lock screw 11 with which said extension is secured to said arm.

The micrometer-gage attachment consists of a holder 12 and a ball 13, said holder being adapted to be engaged with either the anvil 2 or the post 3, with said ball bearing against the inner end of said anvil in one case, and against the inner end of said post in the other case.

The holder 12 is a semi-cylindrical, open-ended clip or sleeve of a size to fit the semi-cylindrical side of the anvil portion of the yoke 1 (or one side of the post 3), having parallel wings 14—14 to embrace the parallel sides of said anvil portion, and provided at one terminal with an annulus or band 15 to receive and embrace the ball 13. The outer end or edge of the band 15 is bent or turned inwardly to form an internally concave flange or rim 16 which prevents the ball from passing completely through such end. There are two deep notches 17 in opposite sides of the holder sleeve, and these notches enable the upper or overhanging portion of the band 15 to be formed, and separate the same from the wings 14. That part of the band 15 that extends across the space between the wings 14, and which is the upper or overhanging portion just referred to, is formed with a central point, as 18, that projects toward the end of the holder which is opposite to that where the rim 16 is located. Initially the pointed part of the band is parallel with the axis of the holder, as shown in Fig. 4, but, after the ball is inserted in said holder and permitted to rest on the rim 16, such pointed part is forcibly bent inwardly against said ball, and engages the latter in such a manner that the same is held in place against said rim and can not roll or fall out of the holder.

In assembling, the ball 13 is introduced between the wings 14 into the holder and caused to seat itself on the rim 16, and then the pointed part (18) of said rim is bent inwardly against said ball, thus completing an internally concave socket for the ball. The ball is free to rotate in any direction in the aforesaid socket. A considerable portion of the ball is exposed beyond the flanged end (16) of the holder, such portion being sufficient to afford the necessary free and clear bearing surface for measuring or gaging purposes. Likewise, a sufficient portion of the ball projects beyond the overhanging part of the band 15, including the point 18, to afford a free and unobstructed bearing on the anvil or post of the micrometer gage.

In practice, the holder 12 is slipped onto the anvil 2, with the ball 13 against the inner end of said anvil, and the micrometer gage thus equipped is applied in the usual manner to the object to be measured, said ball riding freely on the surface with which it is placed in contact, and forming a point contact with such surface, whether or not the same be concave.

Obviously the attachment is as well adapted to be applied to and used on the post 3 as to and on the anvil 2, and the manner of so applying and using the same will be fully understood from the foregoing.

The height-gage attachment consists of a holder 19 and a ball 13 as before. The holder 19 is constructed and arranged to fit on over the outer terminal of the arm extension 9, which terminal is inclined from above downwardly and outwardly as shown, with the ball bearing against the underside of said extension immediately adjacent to the sharp edge thereof.

The holder 19 has an angular top to fit the angle between the horizontal top and inclined end edges of the extension 9, and side pieces to embrace the sides of said extension, and there is an outwardly-extending annulus or band 20 for the ball 13, such band projecting from said side pieces adjacent to their bottom edges. Initially, the band 20 is formed with an interiorly concave flange or rim, as 21, at the top, to receive the ball and prevent it from passing upwardly entirely through such band, although permitting a considerable portion of the ball to extend beyond the top edge of the band, while the bottom of the band is left with sides parallel with the sides of its axis, as shown in Fig. 7. After the ball has been placed in position on or against the rim 21, the band at the end opposite to said rim is forced inwardly onto said ball to form a second concave flange or rim 22 between which and the rim 21 the ball is confined in such a way as to prevent disengagement thereof from the holder. The ball projects to the required extent below the band 20 as it does above said band.

In practice the ball of the second attachment simply takes the place of the extension 9 in direct contact with the work, with advantages very similar to those incident to the first attachment, or which accrue from the use of the latter.

The material of which either the holder 12 or the holder 19 is made may be of a more or less resilient or ductile character.

I am aware that fixed or non-rolling balls have heretofore been applied to measuring instruments, and do not, therefore, seek to claim a combination which includes other than a ball arranged in a socket for free rotation in any direction about the center of said ball.

What I claim as my invention, and desire to secure by Letters Patent, is—

As an improved article of manufacture, a measuring instrument attachment comprising a holder consisting of a semi-cylindrical part, lateral rings extending from the semi-cylindrical part, and an annulus at one end of said semi-cylindrical part, a portion of said annulus extending over the space between said wings, there being notches in opposite sides of the holder to enable such portion to extend over such space, and to separate the same from said wings, such portion and the opposite edge of said annulus being interiorly flanged to form a socket, and a ball loosely arranged in such socket and projecting beyond the same to contact with the anvil of the measuring instrument and the work.

ALFRED H. HITCHCOCK.

Witnesses:
J. S. Dearborn,
F. A. Cutter.